United States Patent
Lee

(10) Patent No.: US 11,761,841 B2
(45) Date of Patent: Sep. 19, 2023

(54) GAS LEAKAGE PREVENTION COOLING BOX FOR PIPE FLANGE CONNECTION AND GAS LEAKAGE SENSING SYSTEM

(71) Applicant: J-SOLUTION CO., LTD., Yongin-si (KR)

(72) Inventor: Seungyong Lee, Hwaseong-si (KR)

(73) Assignee: J-SOLUTION CO., LTD., Yongin-si (KR)

( * ) Notice: Subject to any disclaimer, the term of this patent is extended or adjusted under 35 U.S.C. 154(b) by 365 days.

(21) Appl. No.: 17/160,799

(22) Filed: Jan. 28, 2021

(65) Prior Publication Data

US 2022/0236133 A1 Jul. 28, 2022

(51) Int. Cl.
*G01M 3/04* (2006.01)
*G08B 21/12* (2006.01)

(52) U.S. Cl.
CPC .............. *G01M 3/04* (2013.01); *G08B 21/12* (2013.01)

(58) Field of Classification Search
CPC .......... G01M 3/04; G01M 3/223; G08B 21/12
USPC ...................................................... 73/40.5 R
See application file for complete search history.

(56) References Cited

FOREIGN PATENT DOCUMENTS

| CN | 106481929 A | * | 3/2017 | |
|---|---|---|---|---|
| CN | 106481929 A | | 3/2017 | |
| CN | 206889895 U | | 1/2018 | |
| CN | 211449963 U | | 9/2020 | |
| KR | 101656426 B1 | * | 9/2016 | |
| KR | 101741542 B1 | * | 5/2017 | |
| WO | WO-03019069 A1 | * | 3/2003 | ............ F16L 23/003 |

OTHER PUBLICATIONS

Taiwanese Office Action for related TW application No. 110104683 dated Mar. 31, 2022 from Taiwanese Patent Office.

* cited by examiner

*Primary Examiner* — Lindsay M Low
*Assistant Examiner* — Omar Morales
(74) *Attorney, Agent, or Firm* — Paratus Law Group, PLLC

(57) ABSTRACT

Disclosed is a gas leakage prevention cooling box for a pipe flange connection, which includes: a main body casing having an inner chamber in which connection flanges of a first pipe and a second pipe are located at a center portion of the main body casing, a pipe mounting hole in which the pipes connected around the flange are located on front and rear sides of the inner chamber, and a first half main body and a second half main body coupled to face to each other with the connection flanges of the first and second pipes therebetween and supported by the connection between the first pipe and the second pipe; and a cooling fan installed in the first half main body of the main body casing and configured to supply external air to the inner chamber.

6 Claims, 9 Drawing Sheets

GAS LEAKAGE PREVENTION COOLING BOX FOR PIPE FLANGE CONNECTION AND GAS LEAKAGE SENSING SYSTEM

BACKGROUND

The present disclosure relates to a manufacturing device of a semiconductors or a similar product, and particularly, to a gas leakage prevention cooling box for a pipe flange connection and a gas leakage sensing system capable of safely protecting a pipe connection so that a gas having various chemical properties does not leak out from the pipe connection.

In general, a semiconductor manufacturing process largely includes a fabrication process and an assembly process. Here, the fabrication process refers to a process of manufacturing a semiconductor chip by repeating depositing a thin film on a wafer in various process chambers and selectively etching the deposited thin film to process a specific pattern, and the assembly process refers to a process of individually separating the chips manufactured in the fabrication process and then combining the separated chip with a lead frame to assemble a finished product.

In this semiconductor manufacturing process, a high-temperature and high-pressure gas is transferred through a pipe, and the gas also involve powders having various chemical properties. Therefore, it is important to perform a control so that leakage does not occur at a connection between pipes during gas transfer.

Accordingly, an O-ring is mounted between flanges of both pipes, and thus is compressed to prevent leakage. However, in a pipe connecting member of a related art, a small gap is generated between both side surfaces of a center ring and the flange of the pipe, and thus a vortex is generated. Accordingly, a pressure difference is generated through the gap, and the gas reaches and comes into contact with the O-ring. Therefore, the O-ring is corroded, oxidated, or carbonized by a high-temperature gas having chemical properties and damaged, and as a result, a fatal problem such as leakage occurs.

SUMMARY

The present disclosure provides a gas leakage prevention cooling box for a pipe flange connection and a gas leakage sensing system capable of safely protecting a pipe connection so that a gas having various chemical properties does not leak out from the pipe connection.

In an aspect, there is provided a gas leakage prevention cooling box which is used when manufacturing any one product of product groups including semiconductor products, or is installed at a connection between a first pipe and a second pipe connected to each other to transfer a used gas to prevent gas leakage, including: a main body casing having an inner chamber in which connection flanges of the first pipe and the second pipe are located at a center portion of the main body casing, a pipe mounting hole in which the pipes connected around the flange are located on front and rear sides of the inner chamber, and a first half main body and a second half main body coupled to face to each other with the connection flanges of the first and second pipes therebetween and supported by the connection between the first pipe and the second pipe; and a cooling fan installed in the first half main body of the main body casing and configured to supply external air to the inner chamber.

Here, an accommodation box which isolates and accommodates the connection flanges of the first and second pipes in a space narrower than that of the inner chamber may be further formed in the inner chamber of the main body casing to block a gas so that the gas flows into the inner chamber even when the gas leaks out from the connection between the first and second pipes, the accommodation box may be divided into two half main bodies according to the first half main body and the second half main body, and the half main bodies of the accommodation box may also be coupled to face each other about the connection flanges of the first and second pipes when the first half main body and the second half main body are coupled to face each other, and each of the first half main body and the second half main body of the main body casing may include an air circulation hole communicating with the inner chamber, and external air may be supplied to the inner chamber by the cooling fan to heat exchange with the accommodation box and then discharged.

In addition, in the main body casing, one end portion of the first half main body and one end portion of the second half main body may be hinge-coupled to each other, the first half main body and the second half main body may rotate about a hinge shaft and be opened or closed so that the connections of the first pipe and the second pipe are bitten to each other.

Moreover, the gas leakage prevention cooling box may further include: a center ring module having a center ring located in a concave groove formed inside peripheries of the first and second pipes and an O-ring mounted along an outer peripheral surface of the center ring and compressed between peripheral portions of the flanges to block outflow of a gas; and a clamp configured to clamp the connection flanges of the first and second pipes compressed with the O-ring therebetween from the outside.

Moreover, the center ring module may further include a pair of packer rings disposed to protrude along both corners of an outer peripheral surface of the centering and compressed in the concave groove of the flange.

In addition, the main body casing may further include a gas sensing sensor configured to sense a gas leaking out from the connection between the first and second pipes.

A port configured to communicate with the accommodation box to guide the gas leaking out from the connection between the first and second pipes may be provided on an outer wall of the main body casing, a transparent cap configured to block outflow of the gas guided through the port may be coupled, and a gas sensing tape discolored when coming into contact with the gas may be provided on an inner surface of the transparent cap.

The port may be provided to protrude from a plurality of outer walls located on a side opposite to the main body casing, and the transparent cap and the gas sensing tape may be installed in each of all ports.

In another aspect, there is provided a gas leakage sensing system including: the above-described gas leakage prevention cooling box; a controller configured to recognize a leaked gas when the gas is sensed by the gas sensing sensor and notify the gas leakage; and an alarm configured to receive a control signal from the controller and alert the gas leakage.

DETAILED DESCRIPTION

Figure 1:
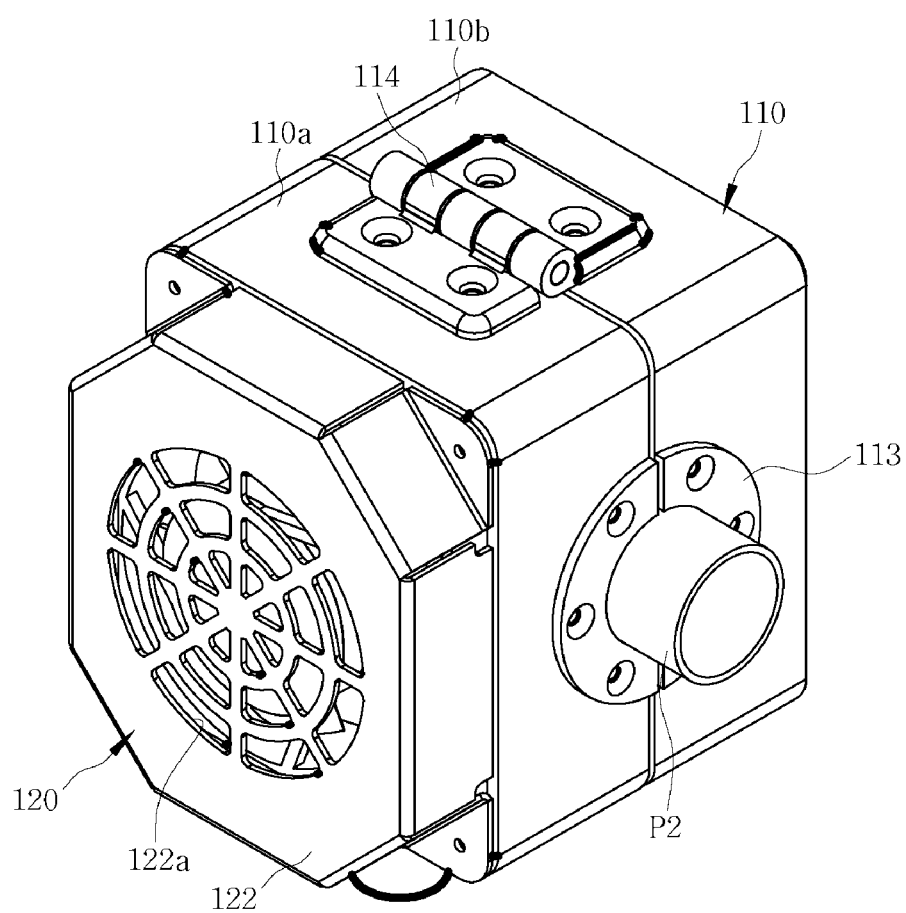
FIGS. 1 and 2 are perspective views of a gas leakage prevention cooling box according to one embodiment of the present disclosure.

A gas leakage prevention cooling box according to embodiments of the present disclosure will be described in detail with reference to the accompanying drawings. Various changes may be applied to the present disclosure, and thus the present disclosure has various forms. Accordingly, specific embodiments are illustrated in the drawings and will be described in detail in the present specification. However, the specific embodiments are not intended to limit the present disclosure to a specific form of disclosure, and should be understood to include all changes, equivalents, or substitutes included in the spirit and scope of the present disclosure. In describing each drawing, similar reference numerals are used for similar elements. In the accompanying drawings, dimensions of components are illustrated to be enlarged than actual for clarity of the present disclosure or reduced than actual for understandings of schematic configurations.

In addition, terms such as first and second may be used to describe various elements, but the elements should not be limited by the terms. These terms are used only for the purpose of distinguishing one component from another component. For example, a first component may be referred to as a second component without departing from the scope of the present disclosure right, and similarly, a second component may also be referred to as a first component. Meanwhile, unless otherwise defined, all terms used herein, including technical or scientific terms, have the same meaning as commonly understood by a person having ordinary skill in a technical field to which the present disclosure belongs. Terms as defined in a commonly used dictionary should be interpreted as having a meaning consistent with the meaning in the context of the related technology, and should not be interpreted as an ideal or excessively formal meaning unless explicitly defined in the present application.

Embodiment

Figure 2:
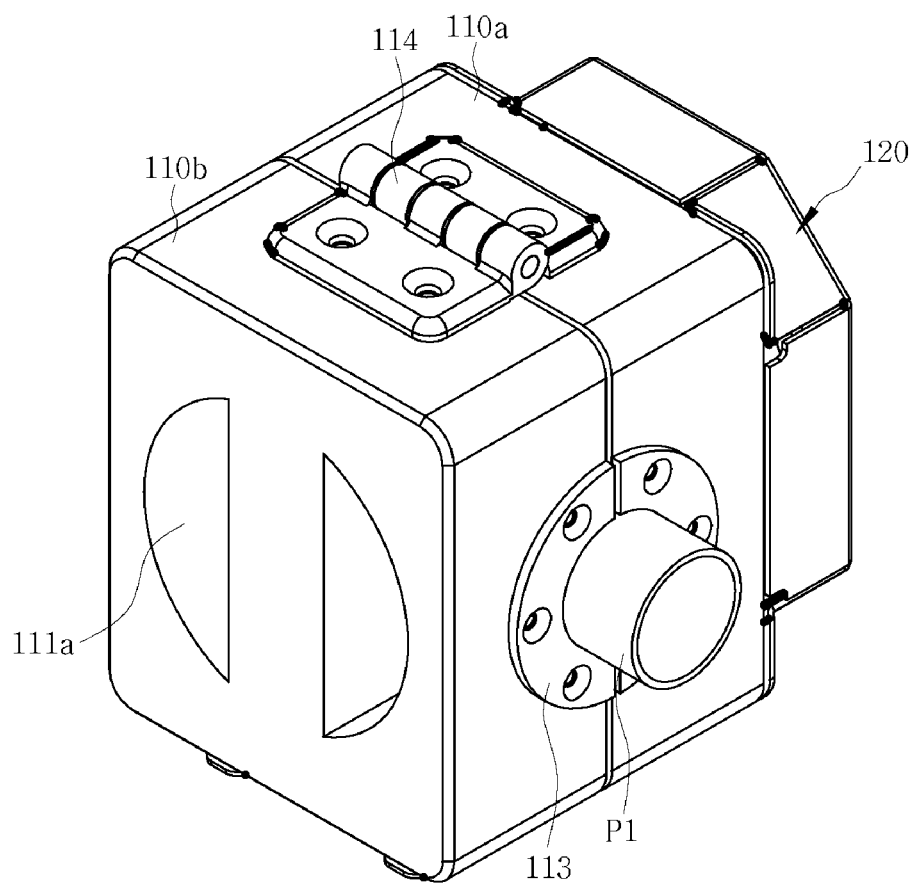
Figure 3:
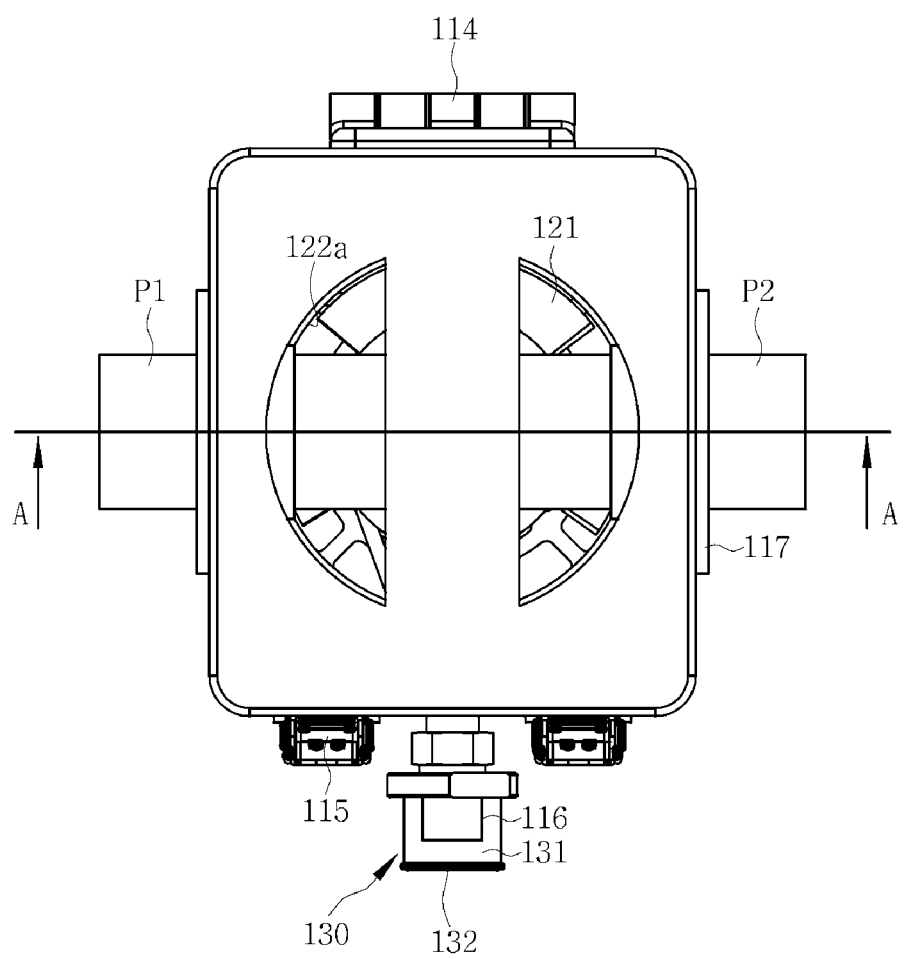
FIG. 3 is a side view of the gas leakage prevention cooling box according to one embodiment of the present disclosure.
Figure 4:
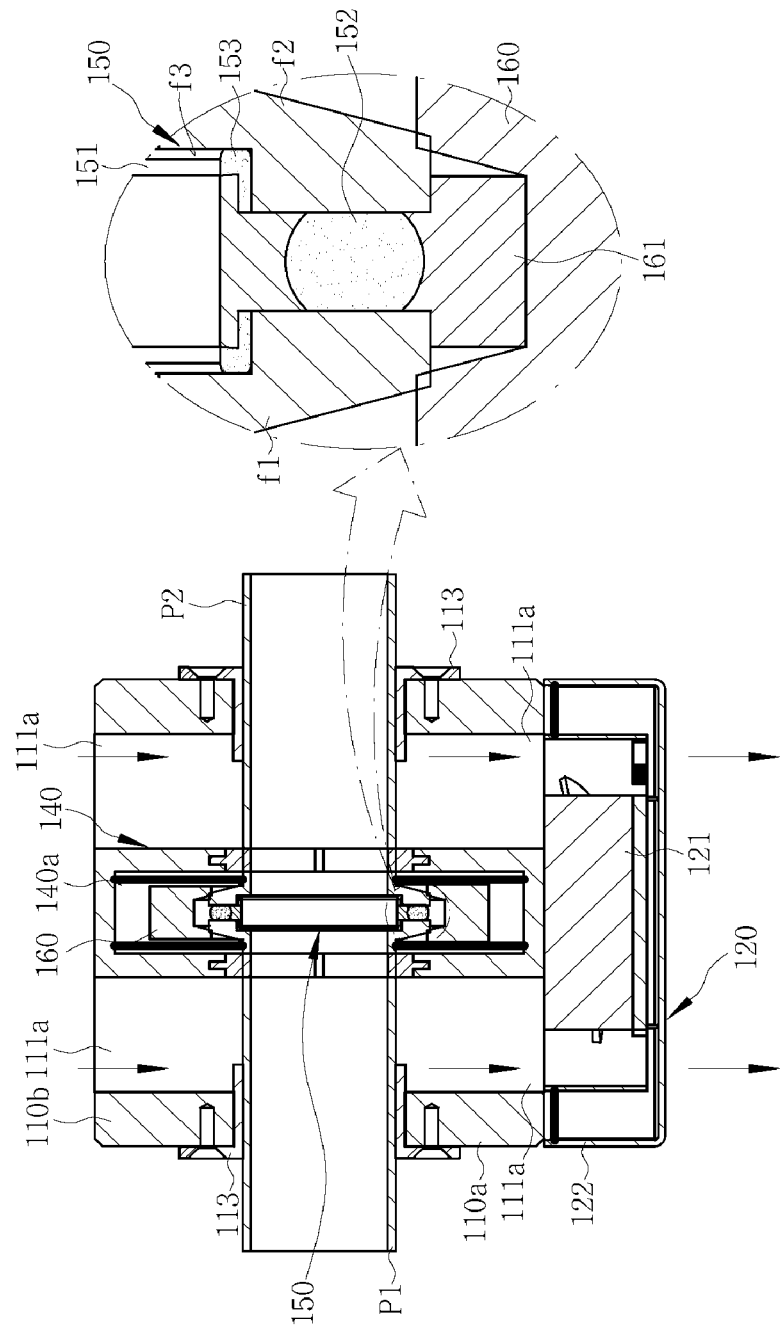
FIG. 4 is a cross-sectional view taken along line A-A of FIG. 3.
Figure 5:
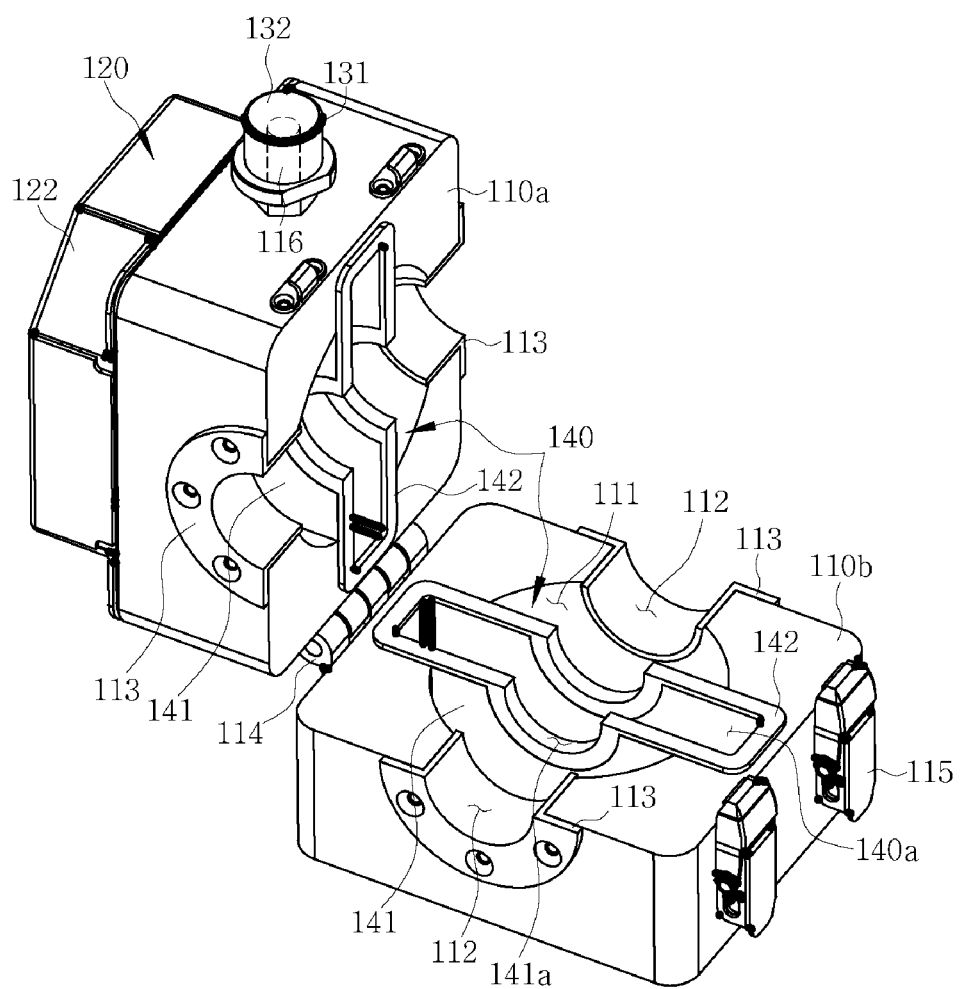
FIG. 5 is a perspective view illustrating a state where the gas leakage prevention cooling box according to one embodiment of the present disclosure is open.
Figure 6:
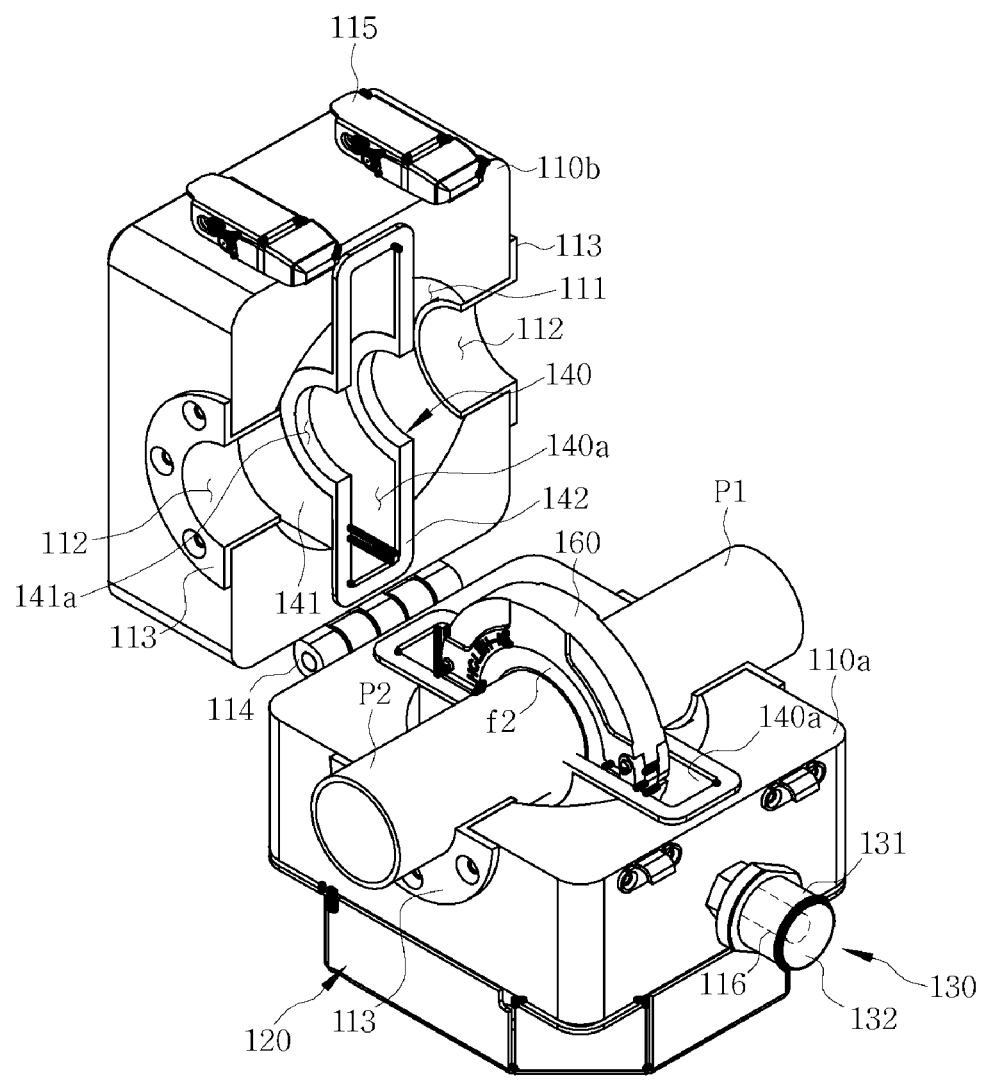
FIG. 6 is a perspective view illustrating a state in which connected first pipe and second pipe are mounted in the state where the gas leakage prevention cooling box according to one embodiment of the present disclosure is open.

FIGS. 1 and 2 are perspective views of a gas leakage prevention cooling box according to one embodiment of the present disclosure, FIG. 3 is a side view of the gas leakage prevention cooling box according to one embodiment of the present disclosure, FIG. 4 is a cross-sectional view taken along line A-A of FIG. 3, FIG. 5 is a perspective view illustrating a state where the gas leakage prevention cooling box according to one embodiment of the present disclosure is open, and FIG. 6 is a perspective view illustrating a state in which connected first pipe and second pipe are mounted in the state where the gas leakage prevention cooling box according to one embodiment of the present disclosure is open.

As illustrated in the drawings, the gas leakage prevention cooling box according to one embodiment of the present disclosure is used when manufacturing any one product of product groups including semiconductor products, or is installed to surround flanges f1 and f2 at a connection between a first pipe P1 and a second pipe P2 to transfer a used gas. The gas leakage prevention cooling box includes, as main components, a main body casing 110 which is installed at the connection of the first pipe P1 and the second pipe P2 and supported, a cooling fan module 120 for cooling the connection between the first pipe P1 and the second pipe P2, a sensor module 130 which senses a gas leaking from the connection between the first pipe P1 and the second pipe P2, and a center ring module 150 and a clamp 160 for packing the connection between the first pipe P1 and the second pipe P2.

The gas leakage prevention cooling box according to one embodiment of the present disclosure safely protects the connection between the first pipe P1 and the second pipe P2 so that a gas having various chemical properties does not leak out from the connection, using these components, and is configured to detect an outflow of the gas more quickly even if the gas leaks out.

Hereinafter, the gas leakage prevention cooling box according to one embodiment of the present disclosure will be described in detail, focusing on the respective components.

As illustrated in the drawings, the main body casing 110 has a rectangular box-shaped outer shape, and has an inner chamber 111, in which connection flanges f1 and f2 of the first pipe P1 and the second pipe P2 are located in a central portion of the main body casing 110. Moreover, pipe mounting holes 112 in which pipes connected around the flanges f1 and f2 are located are provided in front and rear sides of the inner chamber 111. As illustrated in the drawings, each of the pipe mounting holes 112 is formed in a semicircular shape divided into the first half main body 110a and the second half main body 110b, and preferably, a divided adapter 113 for forming holes corresponding to the first pipe P1 and the second pipe P2 is provided.

Here, the hinged first half main body 110a and the second half main body 110b face each other on one end portion of the main body casing 110, a pair of fasteners 115 are installed on the other end portion thereof, and thus, the first half main body 110a and the second half main body 110b can be fastened to each other in a closed state. Accordingly, the first half main body 110a and the second half main body 110b are not completely separated from each other, but are opened and closed around a hinge shaft 114 to be coupled and decoupled. According to this configuration, it is possible to simply install the gas leakage prevention cooling box of the present disclosure in a state where the connection flanges f1 and f2 of the first pipe P1 and the second pipe P2 are bitten to each other. Each of the first half main body 110a and the second half main body 110b of the main body casing 110 includes an air circulation hole 111a communicating with an inner chamber 111, and external air is supplied to the inner chamber 111 through the air circulation hole 111a by the cooling fan 121 to heat exchange with an accommodation box 140 and then discharged.

In addition, the accommodation box 140 having an accommodation space 140a which isolates and accommodates the connection flanges f1 and f2 of the first pipe P1 and the second pipe P2 in a space narrower than that of the inner chamber 111 is further formed in the inner chamber 111 of the main body casing 110. The accommodation box 140 prevents the gas leaking out from the connection between the first pipe P1 and the second pipe P2 from flowing into the inner chamber 111 opened by the air circulation hole 111a, and guide the gas so that the gas moves through a port 116 and comes into contact with a gas sensing sensor. In this way, according to the configuration in which the accommodation box 140 is provided in the inner chamber 111 of the main body casing 110, when a gas leaks out from the connection between the first pipe P1 and the second pipe P2, the gas does not diffuse into the inner chamber 111 having a relatively wide space, but the gas is limitedly diffused only in the accommodation space 140a of the accommodation box 140 which is a narrower space. Accordingly, even if the same amount of gas leaks out, the gas comes into contact with the gas sensing sensor at a higher concentration, and thus it is possible to rapidly sense the leaked gas. Here, the port 116 is a tubular member, is installed to protrude from an outer wall of the main body casing 110, and communicates with the accommodation space 140a of the accommodation box 140. The sensor module 130 including the gas sensing sensor is installed in the port 116.

The accommodation box 140 is divided into two half main bodies 141 according to the first half main body 110a and the second half main body 110b. Accordingly, when the first half main body 110a and the second half main body 110b are coupled to face each other, the half main bodies 141 of the accommodation box 140 are also coupled to face each other about the connection flanges f1 and f2 of the first pipe P1 and the second pipe P2. A pair of half main bodies 141 of the accommodation box 140 includes pipe seating portions 141a on which a pipe is seated in a line facing each other, and when the pair of half main bodies 141 face each other, packing 142 is formed along the facing line to form a circular hole so that a gas does not leak out from the accommodation box 140.

The cooling fan module 120 is installed on an outer surface of the first half main body 110a of the main body casing 110 to supply external air to the inner chamber 111 through the air circulation hole 111a of the main body casing 110. The cooling fan module 120 is coupled to the outer surface of the first half main body 110a and has a fan casing 122 having an opening 122a for sucking and blowing air and a cooling fan 121 installed inside the fan casing 122. According to this configuration, as illustrated in FIG. 4, fresh external air is supplied to the inner chamber 111 through the air circulation hole 111a as the cooling fan 121 rotates, and thus it is possible to effectively cool the connection between the first pipe P1 and the second pipe P2. Then, it is possible to prevent an O-ring 152 and a packer ring 153 of the center ring module 150 installed between the connection flanges f1 and f2 of the first pipe P1 and the second pipe P2 from being easily hardened or corroded due to a high temperature.

The sensor module 130 senses the gas flowing out from the connection between the first pipe (P1) and the second pipe P2 so that a manager or an operator can quickly recognize the gas leakage. To this end, the sensor module 130 includes a transparent cap 131 and a gas sensing tape 132 as illustrated in FIGS. 3, 5 and 6. The transparent cap 131 of the sensor module 130 is coupled to the port 116 installed to protrude from an outer wall of the main body casing 110. The gas sensing tape 132 is adhered to an inner surface of the transparent cap 131 and has a property discolorized when the gas sensing tape 132 comes into contact with a leaked gas. The gas sensing tape 132 can be used by purchasing a commercially available one. According to the configuration of the sensor module 130, when a gas leaks out from the connection of the first pipe P1 and the second pipe P2, the leaked gas is diffused from the accommodation box 140 accommodating the connection flanges (f1, f2) and guided to the inside of the transparent cap 131 through the port 116. Accordingly, the leaked gas reaches the transparent cap 131 and immediately comes into contact with the gas sensing tape 132. Then, as the gas sensing tape 132 is discolored, the manager can easily recognize the leakage of the gas with the naked eye.

In the configuration of the sensor module 130, the port 116 is installed to protrude outward of the main body casing 110 and guides the gas leaked out from the inside of the main body casing 110, the transparent cap 131 to which the gas sensing tape 132 is adhered is installed in the port 116 protruding outward of the main body casing 110 and protrudes outward of the main body casing 10. Accordingly, as long as not viewing the gas sensing tape 132 from a completely opposite side, the gas sensing tape 132 is located at a point which can be seen in all directions.

Figure 9:
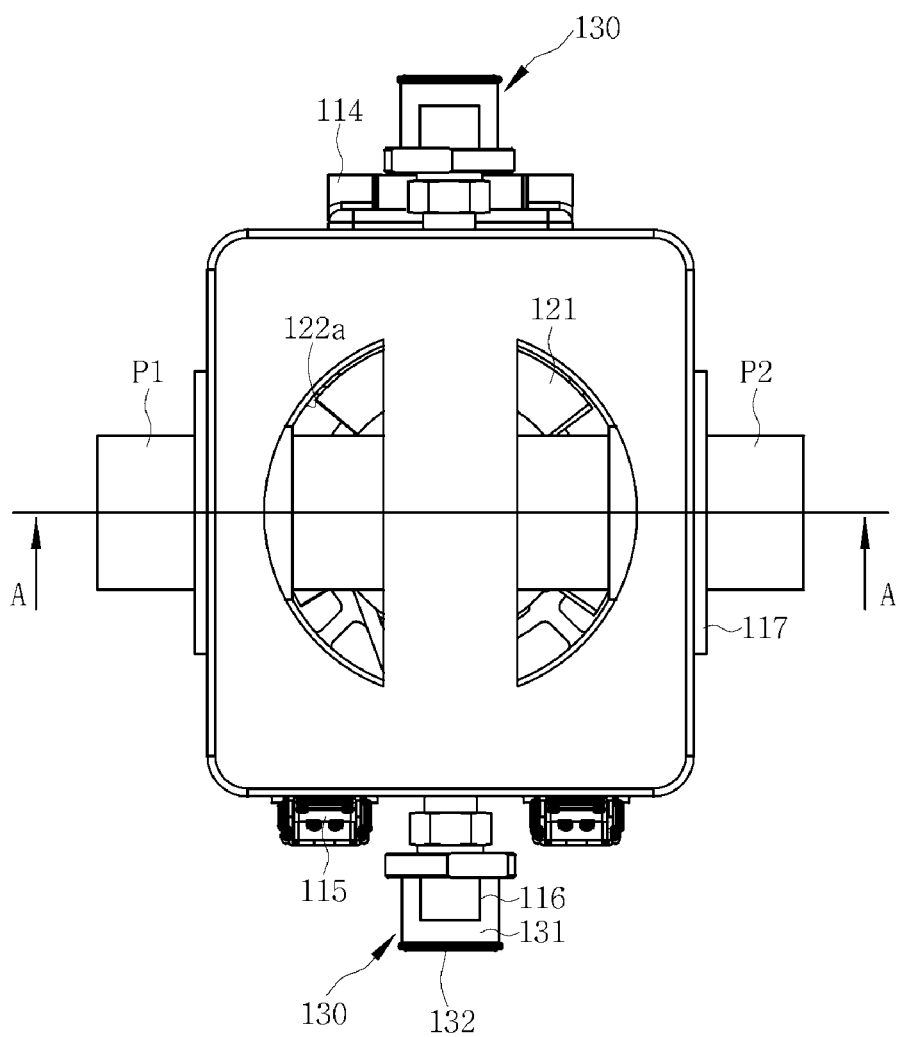
FIG. 9 is a reference view for describing a gas leakage prevention cooling box according to a modification embodiment of the present disclosure.

In relation to the configuration of the sensor module 130, as a modification example illustrated in FIG. 9, more preferably, the port 116 and the sensor module 130 are respectively installed on opposite sides of the main body casing 110. Accordingly, regardless of which direction the manager or operator is located, the gas leakage can be easily checked with the naked eye.

As described above, when the gas leakage prevention cooling box of the present disclosure includes the gas sensing sensor, the gas leakage sensing system may be implemented, which, in addition to the gas leakage prevention cooling box, further includes a controller which recognizes the leaked gas when the leaked gas is sensed and notifies this and an alarm which receives a control signal from the controller and alerts the gas leakage.

Figure 8:
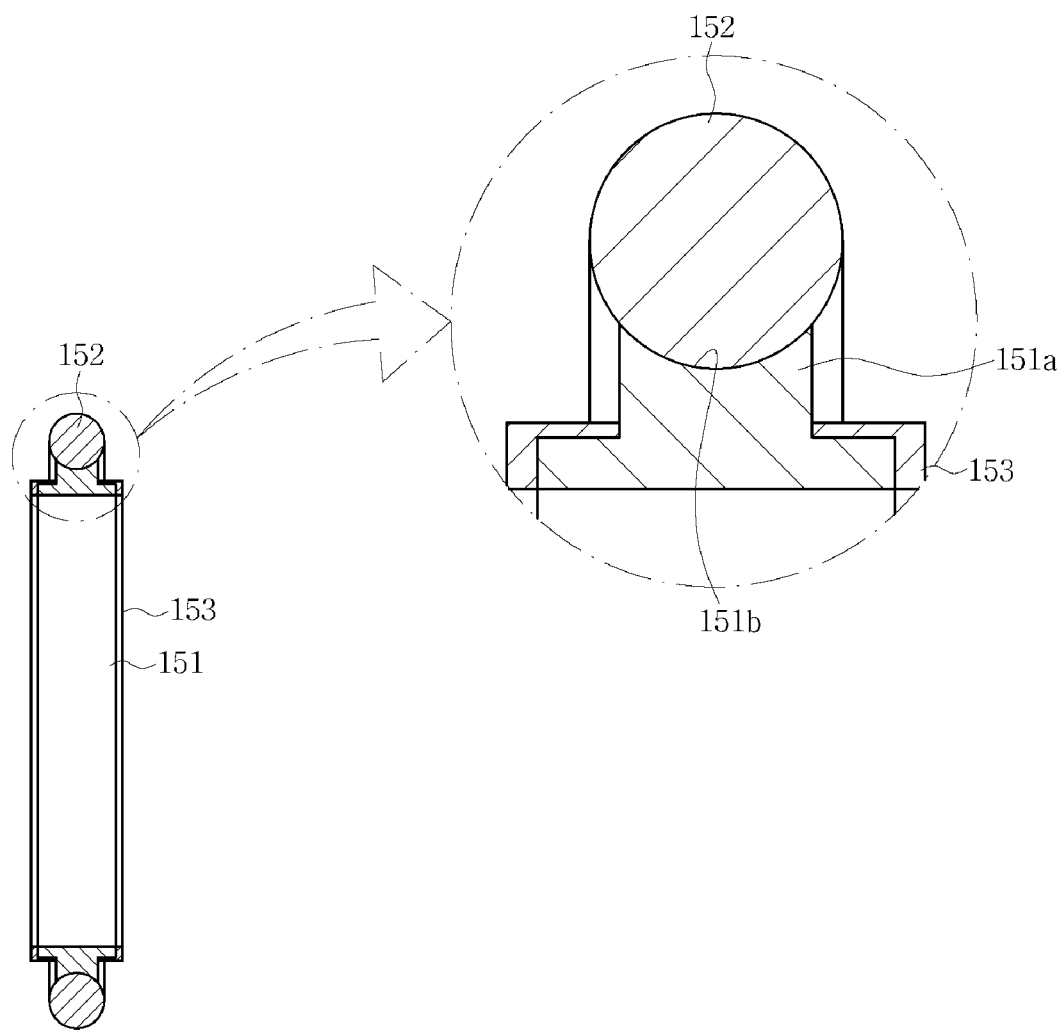
FIG. 8 is a longitudinal sectional view for describing a configuration of the center ring module in the gas leakage prevention cooling box according to one embodiment of the present disclosure.

The center ring module 150 packs a gap so that a gas does not leak out between the flanges f1 and f2 coupled to each other at the connection of the first pipe P1 and the second pipe P2. To this end, the center ring module 150 includes a center ring 151, the O-ring 152, and the packer ring 153 as illustrated in FIG. 8. The center ring 151 is a ring-shaped frame member which is positioned in concave grooves f3 formed inside peripheries of the flanges f1 and f2 of the first pipe P1 and the second pipe P2. A seating groove 151b is formed on an outer peripheral surface of the center ring so that the O-ring can be stably mounted as illustrated in FIG. 8. The O-ring 152 is mounted along an outer peripheral surface of the center ring 151 and compressed between peripheral portions of the flanges f1 and f2 to block outflow of the gas. The packer ring 153 is provided in a pair and protrudes along both corners of the outer peripheral surface of the center ring 151 and is compressed in the concave groove f3 of the flanges f1 and f2. In the configuration of the center ring module 150, unlike the related art, the pair of packer rings 153 is added to block the gas leakage double together with the O-ring 152. Moreover, the O-ring 152 and the packer ring 153 are continuously cooled by the external air supplied to the inner chamber 111 by the cooling fan 121, hardening and damages of the O-ring 152 and the packer ring 153 caused by a high temperature can be minimized, and thus, it is possible to more stably prevent the gas leakage.

Figure 7:
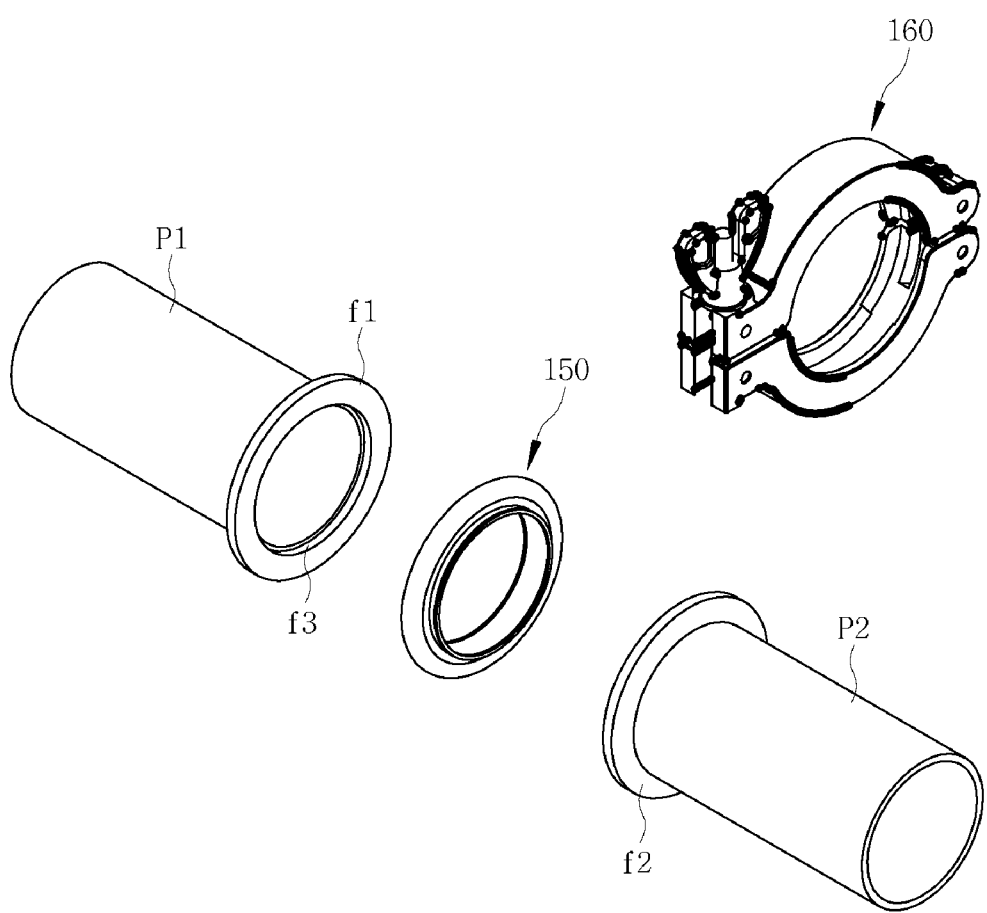
FIG. 7 is an assembly view for describing a center ring module and a clamp in the gas leakage prevention cooling box according to one embodiment of the present disclosure.

As illustrated in FIGS. 4, 6, and 7, the clamp 160 clamps the connection flanges f1 and f2 of the first pipe P1 and the second pipe P2 compressed with the O-ring 152 therebetween from the outside so that the state where the O-ring 152 is compressed between the flanges f1 and f2 is continuously maintained. Here, as illustrated in an enlarged portion of FIG. 4, a support member 161 which supports the O-ring 152 from the opposite side so that the O-ring 152 is stably located on the seating groove 151b of the center ring 150 may be additionally provided on an inner circumferential surface of the clamp 160.

Heretofore, a preferred embodiment of the present disclosure is described. However, various changes, modifications, and equivalents may be used for the present disclosure. It is clear that the present disclosure can be applied in the same manner by appropriately modifying the embodiment. Therefore, the above description does not limit the scope of the present disclosure determined by the limits of the following claims.

According to the gas leakage prevention cooling box and the gas leakage detection system of the present disclosure, the connection between the pipes is cooled by the external air. Accordingly, it is possible to prevent the O-ring from being easily hardened or corroded due to a high temperature, and it is possible to safely protect the connection so that the gas having various chemical properties does not easily leak out.

In addition, according to the present disclosure, the inner chamber of the main body casing is opened to sufficiently supply the external air for cooling, the connection of the pipe is isolated and accommodated in the accommodation box having a size smaller than that of the inner chamber. Accordingly, even when the gas leaks out from the connection of the pipe, it is possible to prevent the gas from flowing to the outside, and it is possible to more quickly sense the gas leaked out from the connection of the pipe.

According to the present disclosure, the center ring module includes the O-ring and the center ring. Therefore, it is possible to prevent the gas leakage in double. Moreover, the accommodation box is provided inside the main body casing, and thus it is possible to prevent the gas leakage in triple.

What is claimed is:

1. A gas leakage prevention cooling box which is used when manufacturing any one product of product groups including semiconductor products, or is installed at a connection between a first pipe and a second pipe connected to each other to transfer a used gas to prevent gas leakage, comprising:
   a main body casing having an inner chamber in which connection flanges of the first pipe and the second pipe are located at a center portion of the main body casing, a pipe mounting hole in which the pipes connected around the connection flanges are located on front and rear sides of the inner chamber, and a first half main body and a second half main body coupled to face to each other with the connection flanges of the first and second pipes therebetween and supported by the connection between the first pipe and the second pipe; and
   a cooling fan installed in the first half main body of the main body casing and configured to supply external air to the inner chamber,
   wherein an accommodation box which isolates and accommodates the connection flanges of the first and second pipes in a space narrower than that of the inner chamber is further formed in the inner chamber of the main body casing to block a gas so that the gas flows into the inner chamber even when the gas leaks out from the connection between the first and second pipes, and
   wherein a port configured to communicate with the accommodation box to guide the gas leaking out from the connection between the first and second pipes is provided on an outer wall of the main body casing, a transparent cap configured to block outflow of the gas guided through the port is coupled, and a gas sensing tape discolored when coming into contact with the gas is provided on an inner surface of the transparent cap.

2. The gas leakage prevention cooling box of claim 1, wherein the accommodation box is divided into two half main bodies according to the first half main body and the second half main body, and the half main bodies of the accommodation box are also coupled to face each other about the connection flanges of the first and second pipes when the first half main body and the second half main body are coupled to face each other, and
   each of the first half main body and the second half main body of the main body casing includes an air circulation hole communicating with the inner chamber, and external air is supplied to the inner chamber by the cooling fan to heat exchange with the accommodation box and then discharged.

3. The gas leakage prevention cooling box of claim 2, wherein in the main body casing, one end portion of the first half main body and one end portion of the second half main body are hinge-coupled to each other, the first half main body and the second half main body rotate about a hinge shaft and are opened or closed so that the connections of the first pipe and the second pipe are bitten to each other.

4. The gas leakage prevention cooling box of claim 2, further comprising:
   a center ring module having a center ring located in a concave groove formed inside peripheries of the first and second pipes and an O-ring mounted along an outer peripheral surface of the center ring and compressed between peripheral portions of the flanges to block outflow of a gas; and
   a clamp configured to clamp the connection flanges of the first and second pipes compressed with the O-ring therebetween from the outside.

5. The gas leakage prevention cooling box of claim 4, wherein the center ring module further includes a pair of packer rings disposed to protrude along both corners of an outer peripheral surface of the centering and compressed in the concave groove of the flange.

6. The gas leakage prevention cooling box of claim 1, wherein the port is provided to protrude from a plurality of outer walls located on a side opposite to the main body casing, and the transparent cap and the gas sensing tape are installed in each of all ports.

* * * * *